United States Patent
Ahuja et al.

(10) Patent No.: US 8,447,745 B2
(45) Date of Patent: May 21, 2013

(54) SYNCHRONIZING FIELD VALUES IN AN ON-DEMAND DATABASE PRIOR TO COMMITTING A CHANGE

(75) Inventors: Neeraj Ahuja, Fremont, CA (US); Susan Sharon Levine, Walnut Creek, CA (US); Simon Y. Wong, San Carlos, CA (US)

(73) Assignee: salesforce.com, inc., San Francisco, CA (US)

(*) Notice: Subject to any disclaimer, the term of this patent is extended or adjusted under 35 U.S.C. 154(b) by 605 days.

(21) Appl. No.: 12/559,257

(22) Filed: Sep. 14, 2009

(65) Prior Publication Data

US 2010/0070480 A1 Mar. 18, 2010

Related U.S. Application Data

(60) Provisional application No. 61/096,644, filed on Sep. 12, 2008.

(51) Int. Cl.
*G06F 17/30* (2006.01)
(52) U.S. Cl.
CPC .... *G06F 17/30002* (2013.01); *G06F 17/30575* (2013.01)
USPC .......................... 707/703; 707/610; 709/203
(58) Field of Classification Search
CPC ...................... G06F 17/30002; G06F 17/30575
USPC ......... 707/802, 610, 703, 713, 803; 709/201, 709/203, 219; 702/123, 185
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,799,305 A * | 8/1998 | Bortvedt et al. | 707/770 |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

OTHER PUBLICATIONS

C. Mohan, "Aries: a transaction recovery method supporting fine-granularity locking and partial rollbacks using write-ahead logging", ACM Transactions on Database Systems (TODS), vol. 17 Issue 1, Mar. 1992, pp. 94-162.*

*Primary Examiner* — Shahid Alam
(74) *Attorney, Agent, or Firm* — Ingrassia Fisher & Lorenz, P.C.

(57) ABSTRACT

Methods and systems are provided for synchronizing field values in transient data objects, such as JAVA® objects, before saving a transaction to a database. A dependency from one data object to another data object is detected, and changes which affect the second data object's fields through the dependency are flowed through to the second data object. This is performed between each step of a multistep save process, such between triggers, validation rules, workflows, and the final committing of data to the database.

20 Claims, 9 Drawing Sheets

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,449,622 B1 * | 9/2002 | LaRue et al. .................. 707/610 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,089,293 B2 * | 8/2006 | Grosner et al. ............... 709/217 |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0156798 A1 * | 10/2002 | Larue et al. .................. 707/610 |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |

* cited by examiner

| STAGE | FORECAST CATEGORY | OPPORTUNITIES AMOUNT | PROBABILITY |
|---|---|---|---|
| S1 - NEGOTIATION | F1 - NOT COMMITTED | $1,000,000 | 10% |
| S2 - PIPELINE | F2 - PIPELINE | $500,000 | 80% |
| S1 - NEGOTIATION | F3 - COMMITTED | $2,500,000 | 50% |
| ⋮ | ⋮ | ⋮ | ⋮ |
|  |  | $3,000,000 |  |

FIG. 3

SYNCHRONIZING FIELD VALUES IN AN ON-DEMAND DATABASE PRIOR TO COMMITTING A CHANGE

CROSS-REFERENCES TO RELATED APPLICATIONS

This application claims the benefit of U.S. Provisional Application No. 61/096,644, filed Sep. 12, 2008, hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

During this process, data may be transformed through various formats and protocols in the various tiers of the system: from Extensible Markup Language (XML) or Hypertext Markup Language (HTML) text to JAVA® Objects to relational data structures and back again. In particular the latter transition is known in the industry as the O/R (object/relational) boundary and is the subject of a great amount of developer effort and 3rd party development tool support. Transitions across the object-to-relational data structure boundary can be difficult because the representation one uses typically in a procedural language like the JAVA® programming language, for a complex object, is typically quite different from the optimal manner in which that data is stored and indexed in a relational database, which is the dominant location for enterprise data of this sort.

A user of a relational database management systems (RDBMS) can implement a user interface (UI) using 3rd party programming tools, which automate transactions across the O/R boundary. These programming tools can include a programming language, such as Apex Code by salesforce.com of San Francisco, Calif., which is integrated with configurations or configured behaviors to help users graphically configure how their systems operate. These tools can be used effectively in on-demand and/or multi-tenant database systems.

Such tools allow fields in some objects to be automatically dependent upon other fields in other objects. For example, a summation field of a container object sums the values of fields of other objects. Some field values are automatically enforced based on other field values. An administrator may set the enforcement code. For example, it may not make sense to have a sales opportunity in which the forecast category is "committed" when it is still in the "negotiation" stage. If the opportunity is entered this way, then the administrator's rules can change the forecast category to one which makes sense, such as "not committed."

The tools also allow for users to program custom code or set configurations. The custom code may incorporate dependencies, such that the field of one object depends upon a value of a field in another object.

Sometimes, a user's custom code may execute before a dependency has been updated. This can cause problems in that the wrong data or an unknown state can be introduced into the system. The end result is that a seemingly straightforward change can corrupt otherwise useful data in the database.

BRIEF SUMMARY

Embodiments in accordance with the present disclosure relate to synchronizing field values before saving a transaction to a database. This synchronization includes detecting a change in a field of one temporary object representing a portion of a database and updating field values in other like objects based on that change prior to committing any field to storage in the database. Updating, or field synchronization, can occur between each step of a multistep save process for a database and/or can occur before or after executing a trigger or event, a workflow, or a spanning formula.

One embodiment relates to accepting a change to a first field in a first transient data object, the first transient data object temporarily representing a portion of a database, determining a dependency exists of a second field in a second transient data object upon the first field in the first transient data object, the second transient data object temporarily representing a portion of the database, and updating the second field in the second transient data object using the change to the first field in the first transient data object and the dependency. After updating, user-supplied code is executed which references the second field to determine a value for a third field, and then the changed values in the first, second, and third fields are committed to the database in a save operation. Thus, the user-supplied code executes on updated or synchronized transient data object fields.

Other embodiments relate to systems and machine-readable tangible storage media which employ or store instructions for the methods described above.

BRIEF DESCRIPTION OF THE DRAWINGS

FIG. 3 illustrates a table of opportunities, which is one representation of a database, in accordance with an embodiment.

DETAILED DESCRIPTION

General Overview

Systems and methods are provided for synchronizing field values in transient data objects, such as JAVA® objects, before saving a transaction to a database. This allows a fully updated transaction, with all dependencies updated, to be saved to a database while avoiding multiple saves. Saving a transaction to a database can be slow, in that it is processor, cache, and bandwidth intensive.

A change to a field in a temporary or other transient object can be received or otherwise accepted, and a dependency on the field from another field in a second transient data object can be looked up, deciphered, searched, calculated, or otherwise determined. The field in the second transient data object is then updated based upon, calculated from, or otherwise using the change to the field in the first data object and the dependency. After the update, customer or other user-supplied code that references the field in the second data object is executed to determine a third field. The third field may be in the first or second transient data objects, or in a separate third data object. The changes, including the first change and those caused by the dependencies, are then all committed to the database. This can be especially useful in multi-tenant databases in which the physical database and resources are shared while data and transactions from individual customers are kept separate.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

System Overview

Figure 1:
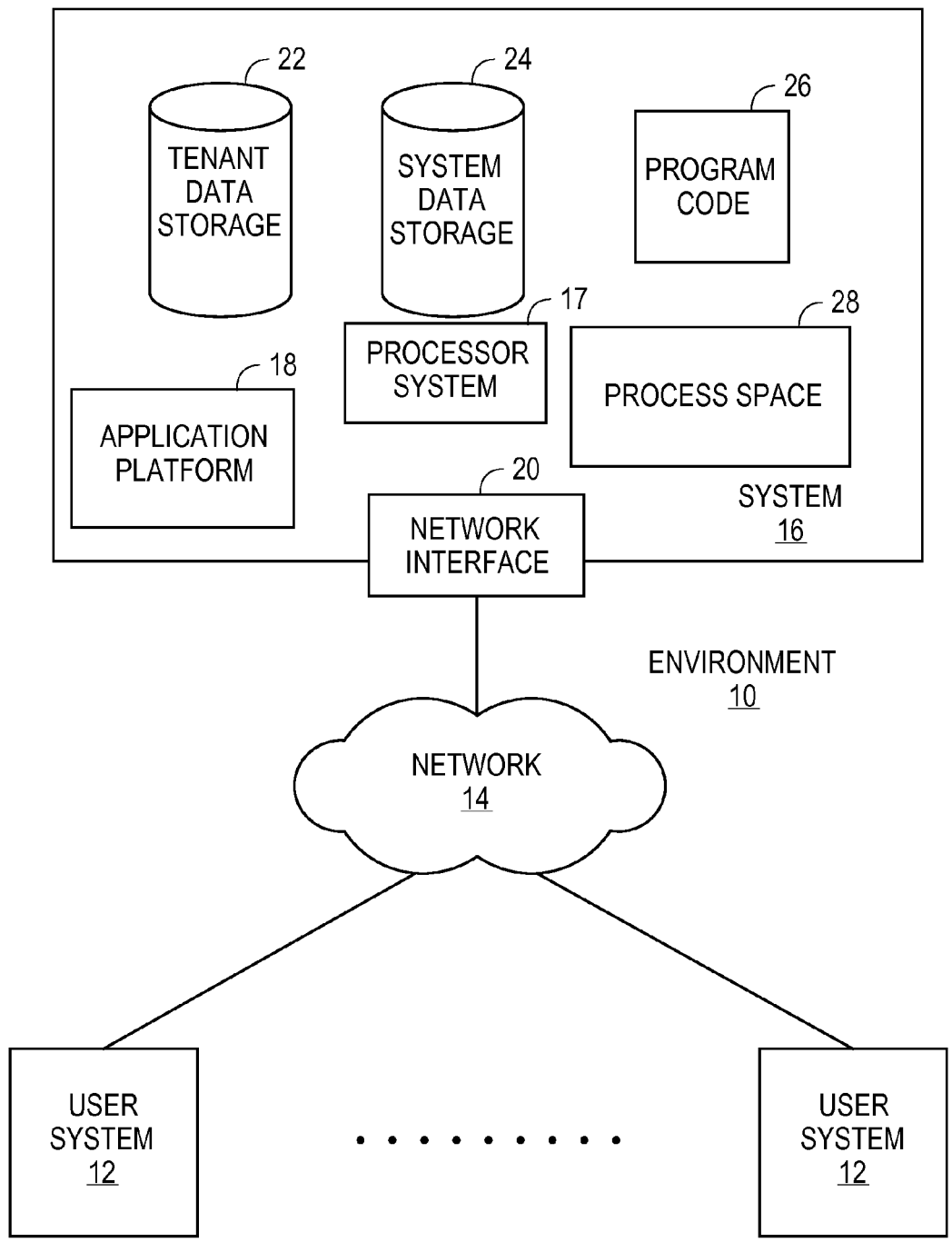
FIG. 1 illustrates a block diagram of an example of an environment wherein an on-demand database service might be used which synchronizes fields before saving in accordance with an embodiment.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein.

Similarly, the database object described herein can be implemented as single databases, a distributed database, a collection of distributed databases, a database with redundant online or offline backups or other redundancies, etc., and might include a distributed database or storage network and associated processing intelligence.

Figure 2:
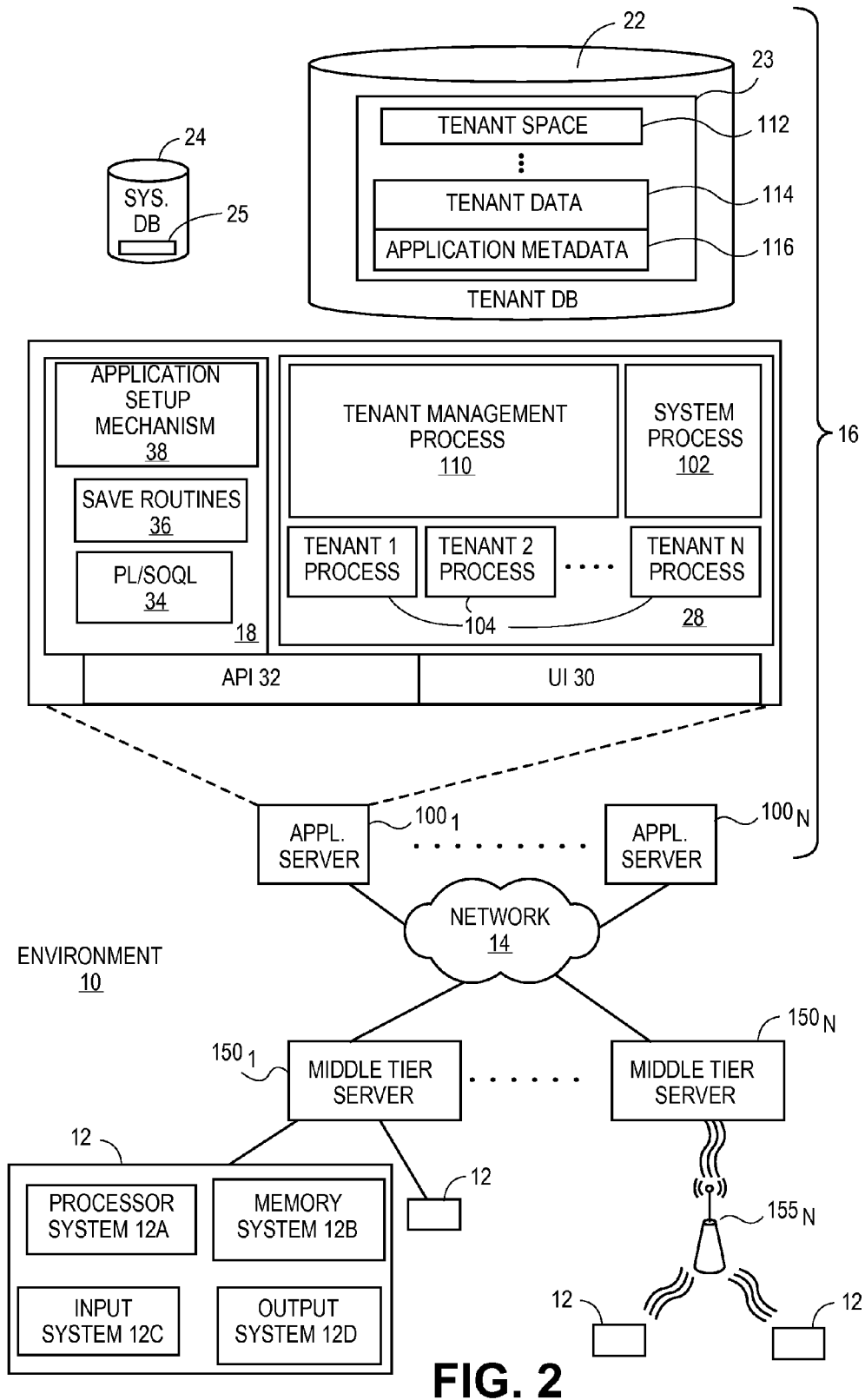
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level.

Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 3 illustrates a table of sales opportunities from a database for salespeople. Table 300 includes fields 302, 304, 306, and 308 which are represented as columns in the table. Each field can have one, several, or many attributes, such as a value which the field currently holds. Rows 310 of table 300 represent individual records. In the exemplary embodiment, each record in table 300 represents a sales opportunity.

A field can have a dependency from another field. For example, at an early stage of negotiation, the forecast category can be forced to equal "not committed," because it makes sense that nothing would be committed at an early stage of negotiation. Also, at an early stage of negotiation, the probability that the business opportunity will come through can be held to a percentage below 50%. This may make sense depending on the business model and experience of the salespeople. Other fields may depend on yet other fields by way of a mathematical operation or other calculation. For example, a rollup summary field 312 adds the values in amount field 306. There is a dependency of rollup summary field 312 on all of the fields which it sums.

Table 300 is but one representation of the fields and data in a portion of a database. Further subdividing of objects can be used to handle transactions to the database. For example, each row of table 300 can be one object, and other fields, such as rollup summary field 312, can be yet another object, such as a 'container object.'

Field Synchronization Overview

Figure 4:
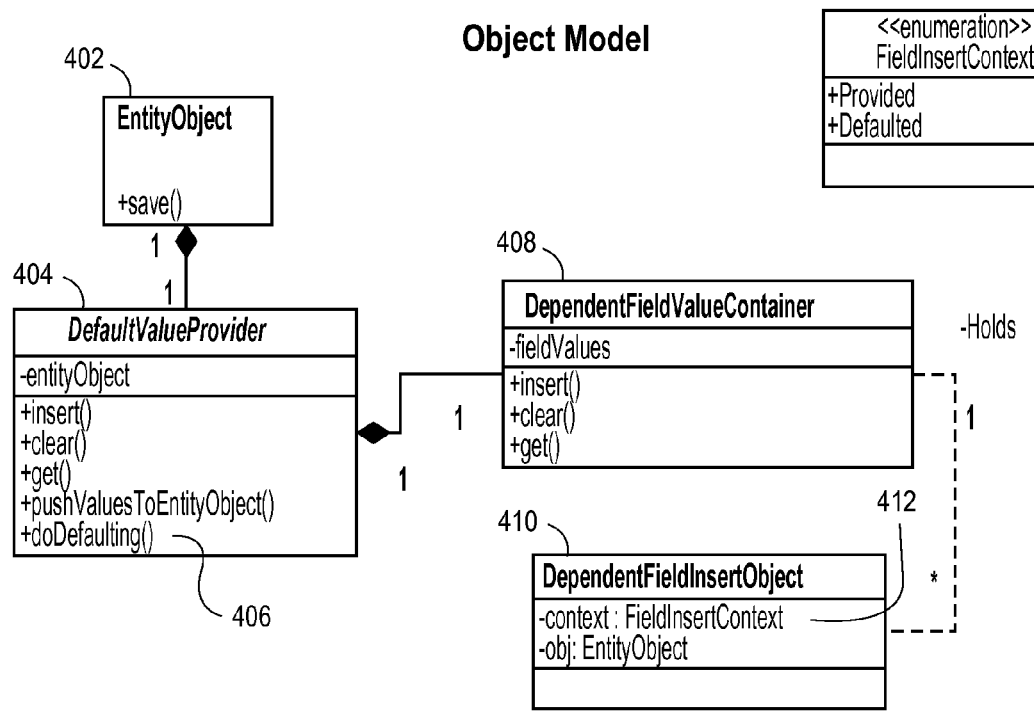
FIG. 4 illustrates an example object model according to one embodiment.

FIG. 4 illustrates an object model according to one embodiment. Common uniform markup language (UML) symbology is used where possible.

It is desirable to ensure that certain fields in objects, for example objects represented by the class EntityObject 402, remain in sync with each other. Fields within instantiations of EntityObjects 402 can be defaulted from another between objects, or the fields should be evaluated together and their individual values set appropriately. To accomplish this, it is desirable to prevent setting such fields on the objects represented by EntityObject 402 one by one, but rather to collect the fields and set them on the EntityObject all together.

In the exemplary embodiment, DefaultValueProvider 404 is an instance variable in EntityObject 402. The instantiation of DefaultValueProvider 404 handles collecting the field values, defaulting them and setting the values on the corresponding EntityObject. Each EntityObject type that needs this behavior should override the doDefaulting( ) method 406 in the DefaultValueProvider class 404 and provide specific implementation details.

DependentFieldValueContainer 408 is a data structure class in which instantiations of objects hold the fields and their values, until they are defaulted.

DependentFieldInsertObject 410 objects hold the value(s) to be inserted in the fields. The objects can also hold the context that the values were set. For example, the attribute FieldInsertContext attribute 412 can be set to either Provided or Defaulted.

EntityObject Changes 1. fieldChangeHook_preChange

Figure 5:
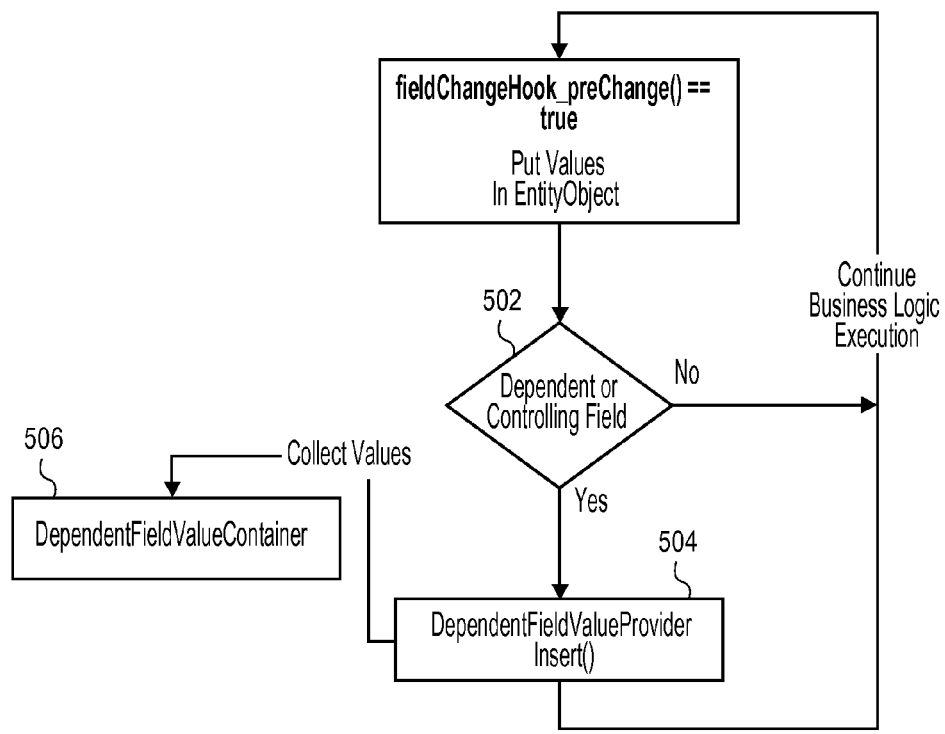
FIG. 5 illustrates a modification of a hook to check whether a particular field being set on an object is a dependent or a controlling field according to one embodiment.

FIG. 5 illustrates a modification of a hook to check whether a particular field being set on an object is a dependent or a controlling field.

In one embodiment this hook is modified to check in step 502 whether a particular field being set on the EntityObject is a Dependent or a Controlling Field. If either a Dependent or a Controlling Field, then the DependentFieldValueProvider-insert( )method is called in step 504 and the value will be held in the DependentFieldValueContainer in step 506 until the method saveHook_HandleDefaultValues( ) is called.

2. EntityObject save( )

Figure 6:
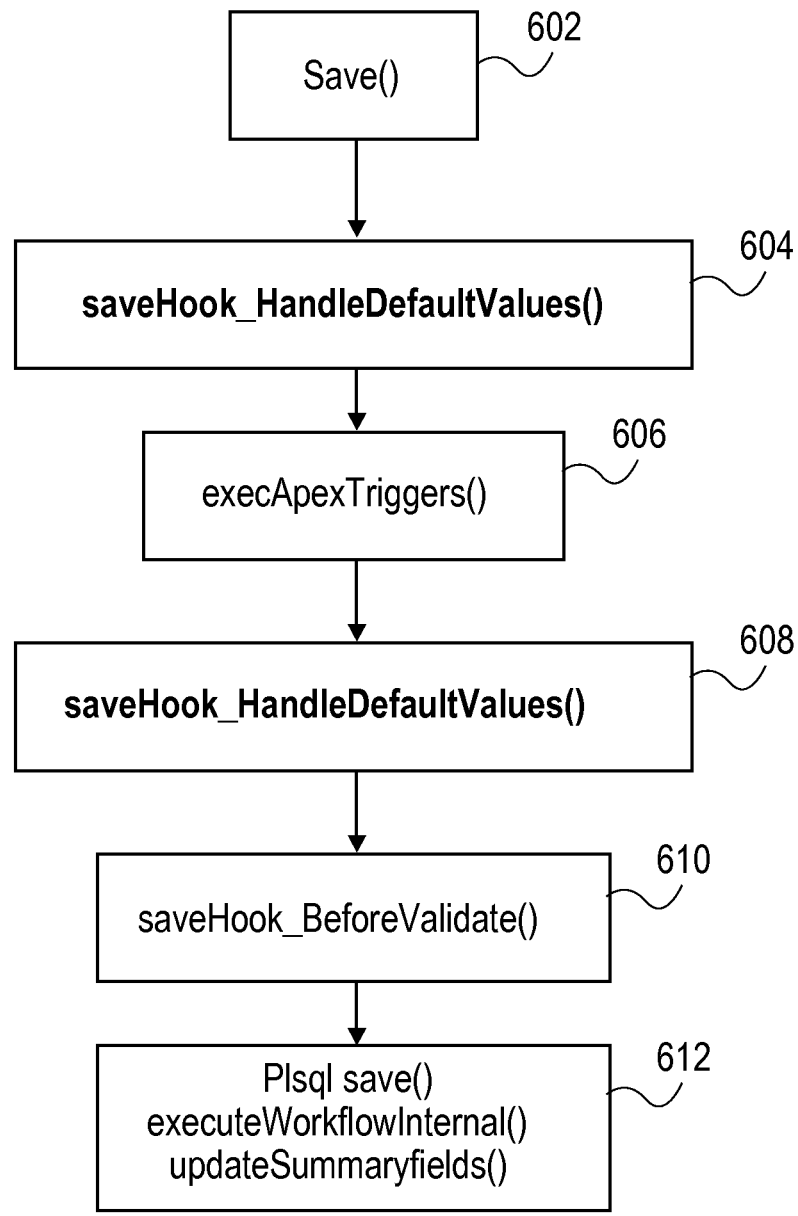
FIG. 6 illustrates a new hook procedure that handles the defaulting of the related fields according to one embodiment.

FIG. 6 illustrates changes to the EntityObject save( ) logic that can be performed to enable an embodiment. After a save( ) is called in step 602, a new hook is provided by saveHook_HandleDefaultValues( ) in step 604. This hook will handle the defaulting of the related fields and it will be called twice: on the initial entry to save( ) in step 604 and after execution of ApexTriggers 606 in step 608. In the exemplary embodiment, this is handled before saveHook_BeforeValidate( ) and Plsql save( ) executeWorkflowInternal( ), and updateSummaryfields( )methods are called in steps 610 and 612.

Figure 7:
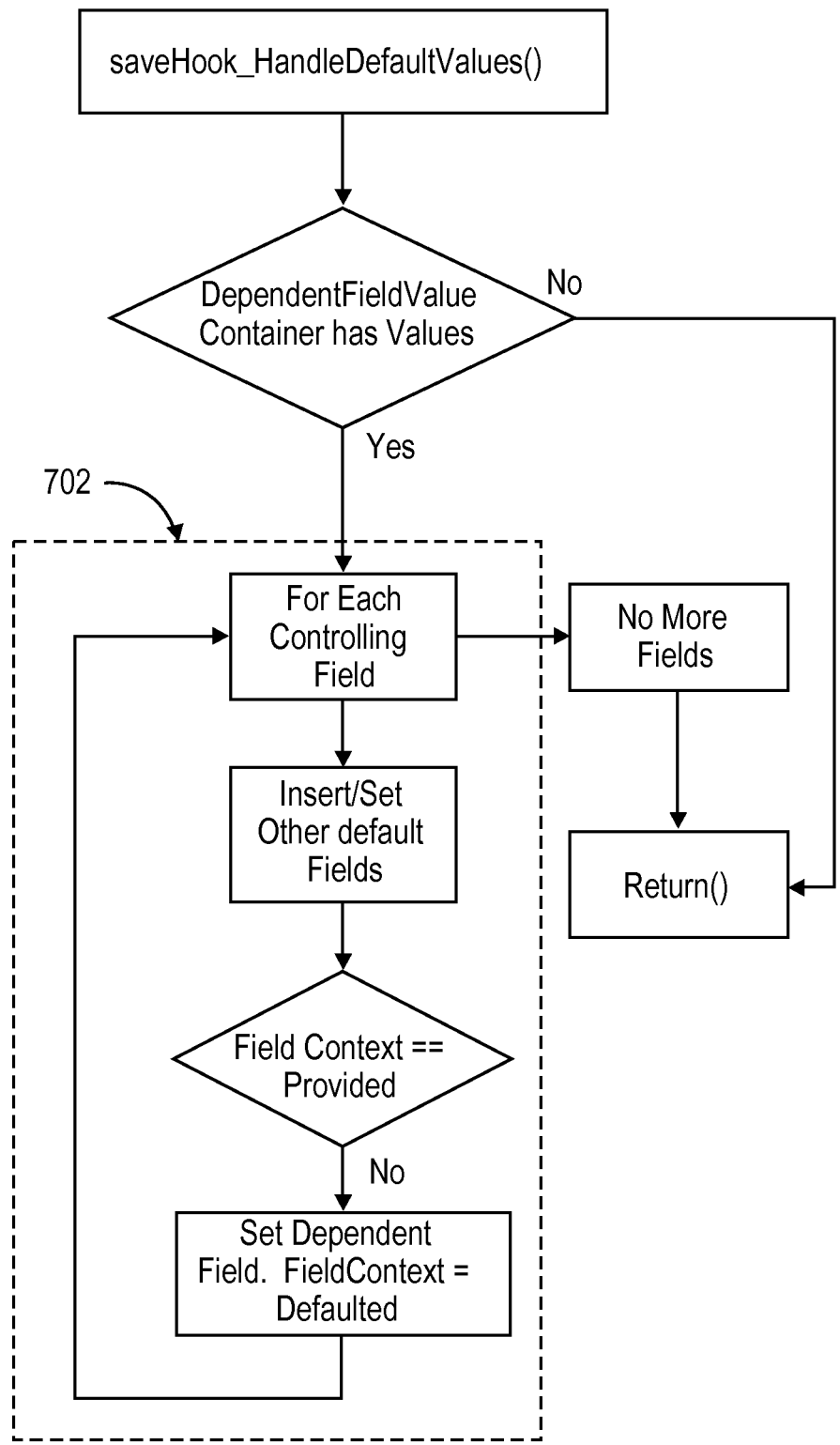
FIG. 7 illustrates a save process for an object according to one embodiment.

FIG. 7 illustrates a save process. During the EntityObject save( ) process every saveHook_HandleDefaultValues( ) is called to ensure that all the fields that were meant to be set on the EntityObject together are set. In loop 702, saveHook_HandleDefaultValues( ) goes through all the controlling fields of the corresponding EntityObject and sets each corresponding dependent field, but only if it does not exist in the DependentFieldValueContainer or FieldContext!=Provided.

Transient Data Objects

Figure 8:
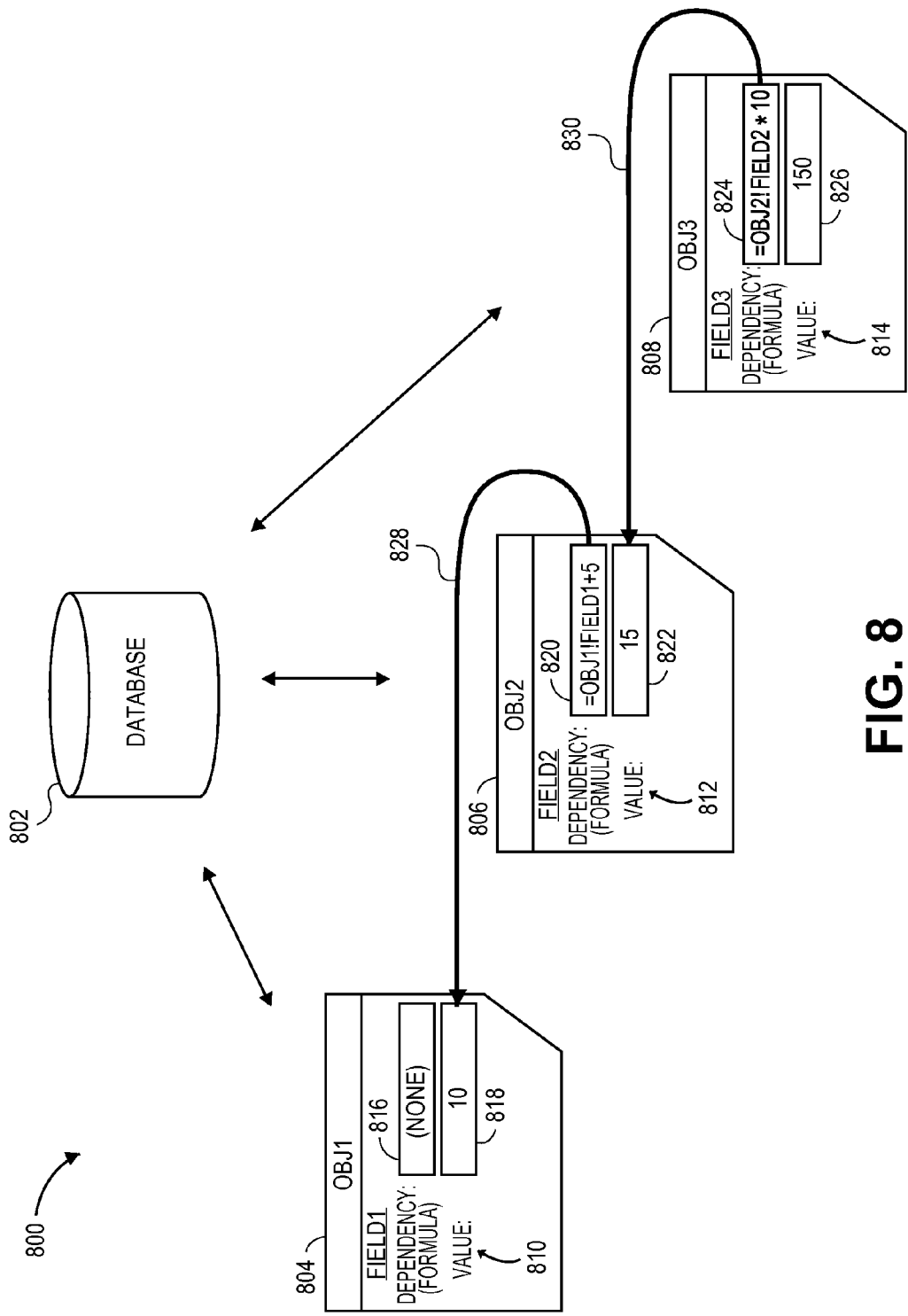
FIG. 8 illustrates three transient data objects representing portions of a database according to one embodiment.

FIG. 8 illustrates three transient data objects, each representing a portion of database 802. In the exemplary embodiment, the data objects are JAVA® objects. First transient data object 804, OBJ1, represents a portion of database 802. Likewise, second transient data object 806, OBJ2, and third transient data object 808, OBJ3, represent portions of the same database. A transient data object includes objects which facilitate transactions with the database and are instantiated and destroyed just before and directly after a transaction, respectively. Transient data objects also include objects which exist during the entire time that there is a connection with the database. Such transient data objects can be re-used among different transactions, processes, and users.

Data objects 804, 806, and 808 have at least one field 810, such as Field1 in first transient data object 804, Field2 in second transient data object 806, and Field3 in third transient data object 808. Field1 includes attributes, such as dependency attribute 816 and value 818. Dependency attribute 816 is empty or null, indicating that a dependency does not exist. That is, Field1 does not depend on another field.

Referring to a field without specifying the attribute generally is a reference to the value within the field.

Field2 includes dependency attribute 820, shown as the formula, "=OBJ1!Field1+5". The dependency, shown as dependency 828, is to the value in Field1 in OBJ1. The equation adds 5 to the referenced value. Thus, the value for Field2 is "15", which is shown in value attribute 822. Because the dependency attribute is populated, dependency 820 does exist.

Field3 includes dependency attribute 824, shown as the formula, "=OBJ2!Field2*10". The dependency, shown as dependency 830, is to the value in Field2 in OBJ2. The equation multiplies the referenced value by 10. Thus, the value for Field3 is "150", which is shown in value attribute 826.

When a change is made to the value in Field1 of the first transient data object, one can determine whether a dependency exists by looking at dependency attribute 820. If it is empty, then there is no dependency. If it is populated with a formula that refers to another field, then a dependency does exist. After determining that a dependency does exist, such as in step 502 of FIG. 5, the change is flowed to the formula in dependency attribute 820 of second transient data object 806.

After updating, user-supplied code such as "=OBJ2!Field2*10" in third transient data object 808 is run or otherwise executed to determine value 826. User-supplied code can include code in an event or a trigger, a workflow, or a spanning formula. After all fields are updated or synchronized, the changed values in the fields of the objects are committed or saved to database 802.

Figure 9:
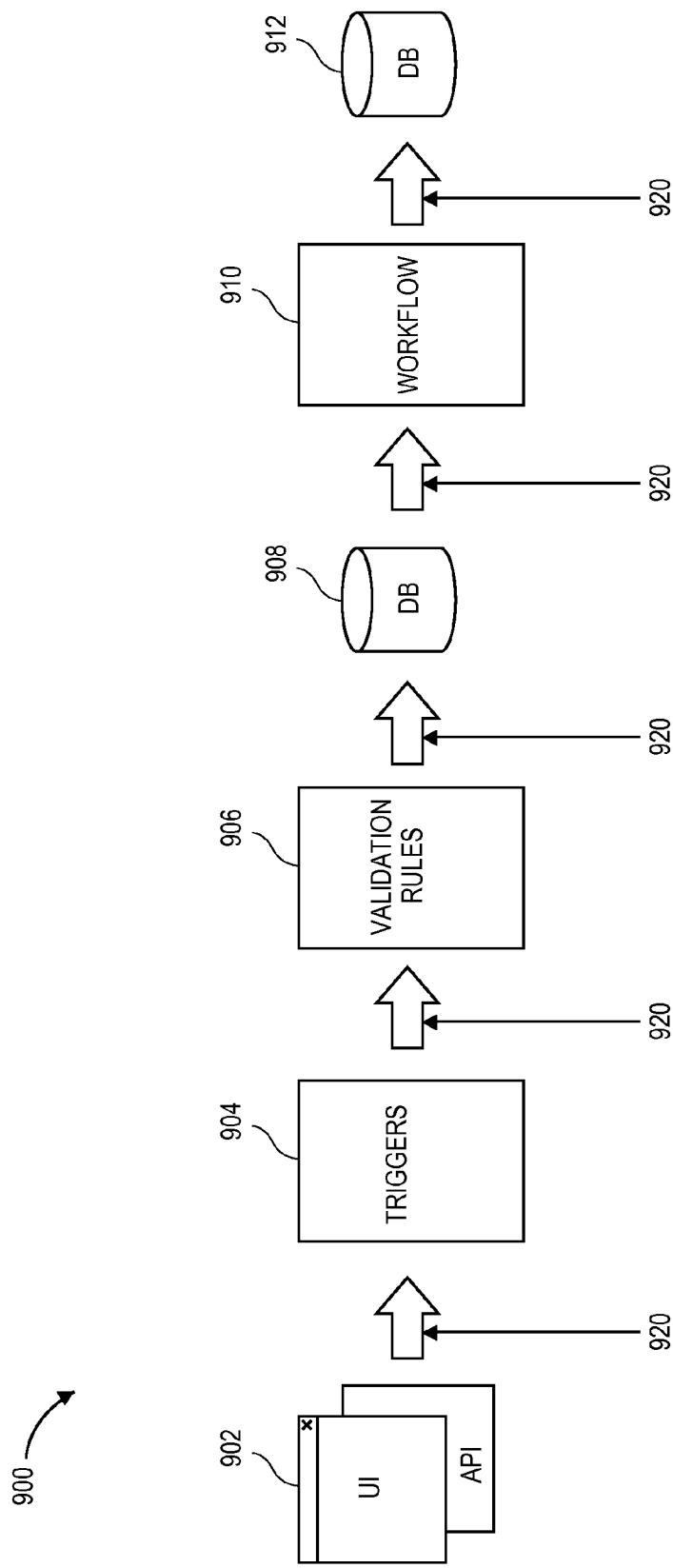
FIG. 9 illustrates steps between which synchronization of fields can occur according to an embodiment.

FIG. 9 illustrates steps in a multistep process between which field values are synchronized in accordance with one embodiment. After the user interface (UI) or application programming interface (API) changes a field in a transient data object in step 902, and before triggers/events execute in step 904, synchronization 920 occurs. Likewise, synchronization 920 can occur between every major step of multistep save process 900, including before step 906 of execution of validation rules, before step 910 of workflow execution, and before step 912 in which field values are committed to the database.

Figure 10:
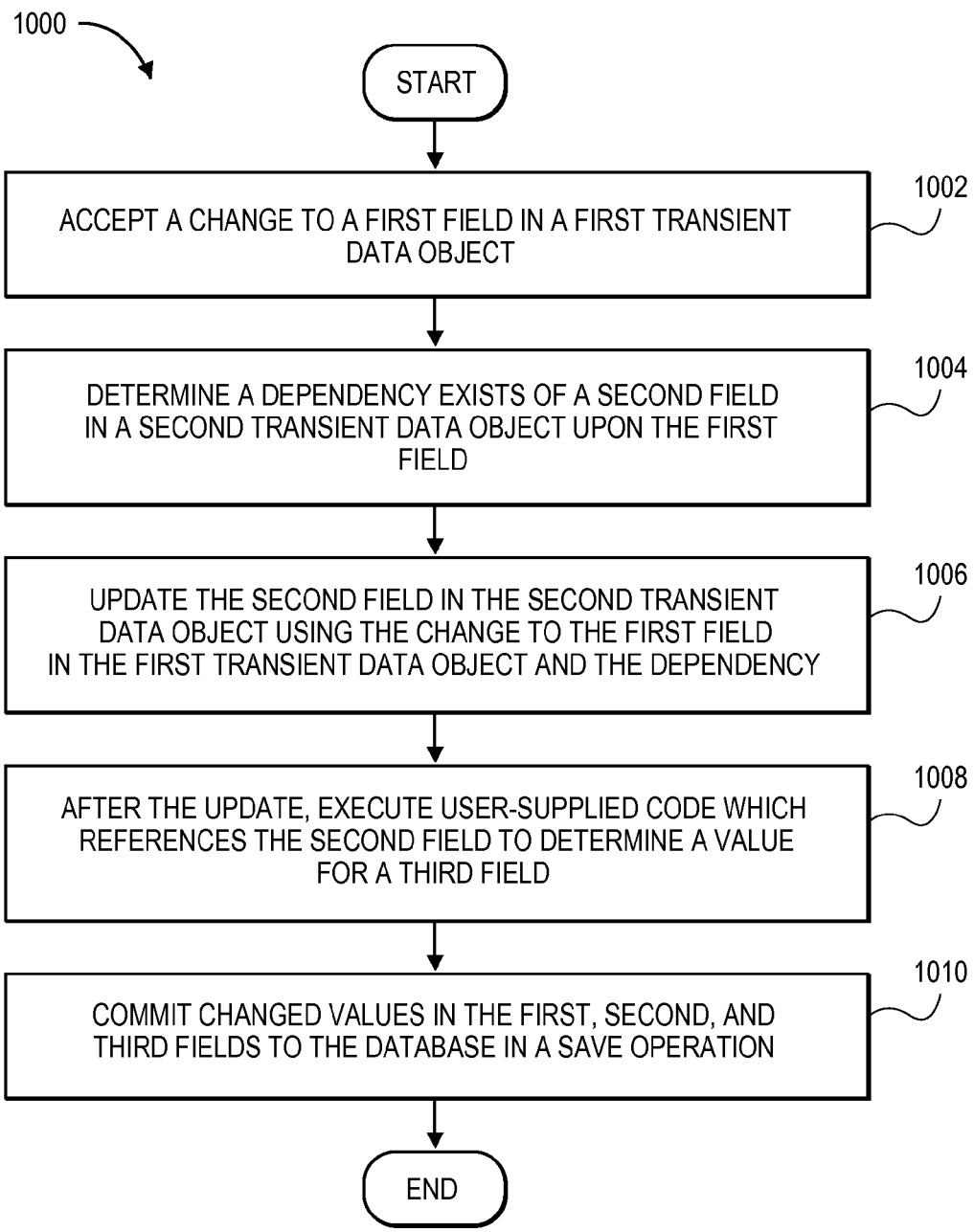
FIG. 10 is a flowchart illustrating an embodiment in accordance with the present invention.

FIG. 10 shows an example flowchart illustrating a process in accordance with one embodiment. This process can be automated in a computer or other machine. The process can be coded in software, firmware, or hard coded as machine-readable instructions and run through a processor that can implement the instructions. In operation 1002, a change to a first field in a first transient data object is accepted. The change can be from a user, API, etc. In operation 1004, a determination is made whether a dependency exists of a second field in a second transient data object upon the first field in the first transient data object. In operation 1006, the second field in the second transient data object is updated using the change to the first field in the first transient data object and the dependency. In operation 1008, user-supplied code, such as that in a trigger, is executed which references the second field to determine a value for a third field. In operation 1010, changed values in the first, second, and third fields are committed to the database in a save operation. These operations may be performed in the sequence given above or in different orders as applicable.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for synchronizing field values before saving a transaction to a database, the method comprising:
   accepting a change to a first field in a first transient data object, the first transient data object temporarily representing a portion of a database;
   determining that a dependency of a second field in a second transient data object upon the first field in the first transient data object exists, the second transient data object temporarily representing a portion of the database;
   updating the second field in the second transient data object using the change to the first field in the first transient data object and the dependency;
   after updating, executing user-supplied code which references the second field to determine a value for a third field; and
   committing changed values in the first, second, and third fields to the database in a save operation, whereby the user-supplied code executes on updated transient data object fields.

2. The method of claim 1 wherein the third field is in the first transient data object.

3. The method of claim 1 wherein the third field is in the second transient data object.

4. The method of claim 1 wherein the third field is in a third transient data object, the third transient data object temporarily representing a portion of the database.

5. The method of claim 1 wherein the change to the first field and the update to the second field are tracked to enable a rollback of the change to the database.

6. The method of claim 1 wherein the method is performed between steps in a multistep process to save the change to the database.

7. The method of claim 1 wherein the first and second transient data objects are part of a same transaction with the database on behalf of a user.

8. The method of claim 1 wherein the user-supplied code includes a formula.

9. The method of claim 1 further comprising running a trigger before committing the changed values to the database, wherein the trigger includes the user-supplied code.

10. The method of claim 1 further comprising running a workflow before committing the changed values to the database, wherein the workflow includes the user-supplied code.

11. The method of claim 1 further comprising running a spanning formula before committing the changed values to the database, wherein the spanning formula includes the user-supplied code.

12. The method of claim 1 wherein the first and second transient data objects are Java® objects.

13. The method of claim 1 wherein the accepting, determining, updating, and executing are performed prior to the committing.

14. The method of claim 1, further comprising updating the third field using the value prior to committing the changed values in the first, second, and third fields to the database in the save operation.

15. The method of claim 1, the updated transient data object fields comprising the changed values in the first, second, and third fields, wherein committing the changed values in the first, second, and third fields to the database in the save operation comprises executing a workflow on the updated transient data object fields prior to saving the updated transient data object fields to the database.

16. The method of claim 1, the updated transient data object fields comprising the changed values in the first, second, and third fields, wherein committing the changed values in the first, second, and third fields to the database in the save operation comprises executing a validation rule on the updated transient data object fields prior to saving the updated transient data object fields to the database.

17. The method of claim 1, wherein committing the changed values comprises committing the changed values in the first, second, and third fields to the database after updating the second field in the second transient data object using the change to the first field in the first transient data object and the dependency, executing the user-supplied code which references the second field to determine the value for the third field, and updating the third field using the value.

18. The method of claim 1, wherein the first transient data object and the second transient data object each comprise a temporary data object that exists during an entire time that there is a connection with the database or an object facilitating the transaction that is instantiated before and destroyed after the transaction.

19. A non-transitory machine-readable storage medium having instructions stored thereon for causing one or more machines to perform operations comprising:
  accepting a change to a first field in a first transient data object, the first transient data object temporarily representing a portion of a database;
  determining that a dependency of a second field in a second transient data object upon the first field in the first transient data object exists, the second transient data object temporarily representing a portion of the database;
  updating the second field in the second transient data object using the change to the first field in the first transient data object and the dependency;
  after updating, executing user-supplied code which references the second field to determine a value for a third field; and
  committing changed values in the first, second, and third fields to the database in a save operation, whereby the user-supplied code executes on updated transient data object fields.

20. A computer system comprising a processor operatively connected with memory, the processor executing:
  program code to accept a change to a first field in a first transient data object, the first transient data object temporarily representing a portion of a database;
  program code to determine that a dependency of a second field in a second transient data object upon the first field in the first transient data object exists, the second transient data object temporarily representing a portion of the database;
  program code to update the second field in the second transient data object using the change to the first field in the first transient data object and the dependency;
  program code to, after updating, execute user-supplied code which references the second field to determine a value for a third field; and
  program code to commit changed values in the first, second, and third fields to the database in a save operation, whereby the user-supplied code executes on updated transient data object fields.

* * * * *